United States Patent [19]

Beaman et al.

[11] 3,865,823

[45] Feb. 11, 1975

[54] (2-NITRO-1-IMIDAZOLYL)-CARBAMATES

[75] Inventors: Alden Gamaliel Beaman, East Princeton, Mass.; William Paul Tautz, New York, N.Y.

[73] Assignee: Hoffmann-LaRoche Inc., Nutley, N.J.

[22] Filed: Nov. 29, 1973

[21] Appl. No.: 420,241

Related U.S. Application Data

[63] Continuation-in-part of Ser. No. 312,406, Dec. 5, 1972, abandoned, which is a continuation-in-part of Ser. No. 280,632, Aug. 14, 1972, Pat. No. 3,803,165.

[52] U.S. Cl.... 260/247.2 B, 260/268 C, 260/293.7, 260/307 R, 260/307 F, 260/309, 424/248, 424/250, 424/267, 424/272, 424/273

[51] Int. Cl............................................ C07d 49/36

[58] Field of Search .. 260/247.2 B, 250 A, 256.4 R, 260/256.4 N, 268 C, 293.7, 295 AM, 307 R, 307 H, 309

[56] References Cited
OTHER PUBLICATIONS
Gante, J. Chem. Ber. 99 (8) 2,521–2,525 (1966).

*Primary Examiner*—Lorraine A. Weinberger
*Assistant Examiner*—Paul J. Killos
*Attorney, Agent, or Firm*—Samuel L. Welt; Jon S. Saxe; R. Hain Swope

[57] ABSTRACT

(2-Nitro-1-imidazolyl)-carbamates wherein the imidazolyl radical is separated from the carbamate by a polymethylene chain or substituted polymethylene chain which are useful as germicides and antiprotozoal agents are disclosed.

47 Claims, No Drawings

(2-NITRO-1-IMIDAZOLYL)-CARBAMATES

RELATED APPLICATIONS

This application is a continuation-in-part of U.S. patent application Ser. No. 312,406 filed Dec. 5, 1972, now abandoned which in turn is a continuation-in-part of U.S. patent application Ser. No. 280,632 filed Aug. 14, 1972 now U.S. Pat. No. 3,803,165.

DETAILED DESCRIPTION OF THE INVENTION

The present invention relates to novel (2-nitro-1-imidazolyl)-carbamates. More particularly, the invention relates to (2-nitro-1-imidazolyl)-carbamates represented by the formula

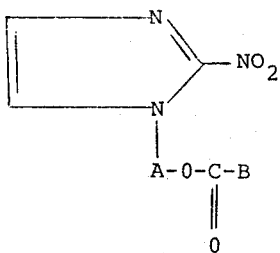

I wherein A represents a member selected from the group consisting of a polymethylene chain having from 2 to 6 carbon atoms,

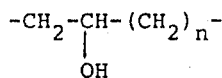

wherein $n$ is an integer of 1 to 4 and

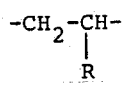

wherein R is selected from the group consisting of lower alkyl, halo lower alkyl, halo-lower alkoxy-lower alkyl, lower alkoxy-lower alkyl,

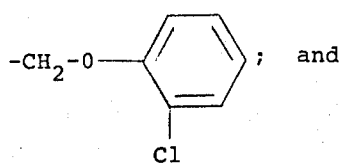; and and B represents a member selected from the group consisting of: (1) an amino radical selected from the group consisting of amino, mono-lower alkyl amino, di-lower alkyl amino, hydroxy lower alkyl amino, cycloalkylamino, aralkylamino, arylamino; and (2) a 5- or 6-membered nitrogen containing heterocycle represented by

wherein Z represents lower alkylene, aza-lower alkylene, N-lower alkyl-aza-lower alkylene or oza-lower alkylene;

and pharmaceutically acceptable acid addition salts thereof.

Among the compounds of the formula I, there are included compounds represented by the formula

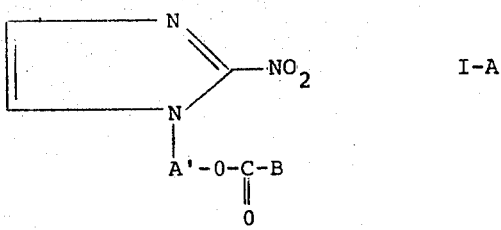

I-A wherein A' is a polymethylene chain of 2 to 6 carbon atoms and B is as defined above;

compounds represented by the formula

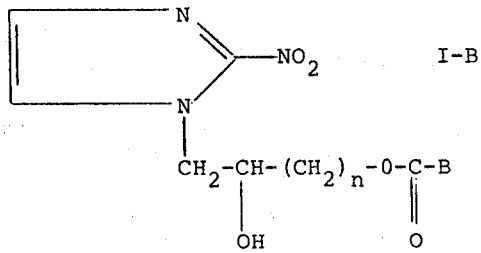

I-B wherein $n$ is an integer of from 1 to 4 and B is as defined above; and compounds represented by the formula

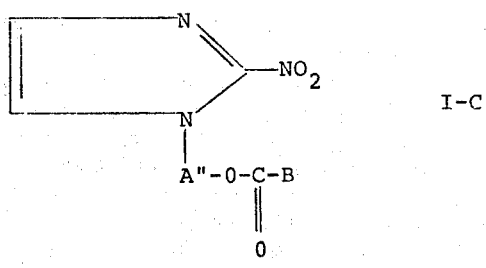

I-C wherein A" signifies

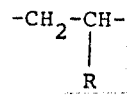

R and B being as defined above.

The term "lower alkyl" as used throughout the specification denotes both straight-chain and branched-chain saturated hydrocarbons containing 1-7 carbon atoms within the chain including, for example, methyl, ethyl, normal propyl, isopropyl, butyl, isobutyl, sec. butyl, t-butyl, pentyl, hexyl and the like. The terms "halo" and "halogen" denote all halogens, particularly chlorine and fluorine. The term "halo-lower alkyl" represents a monohalo-lower alkyl radical as well as polyhalo-lower alkyl radical such as trichloromethyl, trifluoromethyl, 1,2-dichloroethyl and the like. The term "aryl" denotes phenyl and substituted phenyl, a 5- or 6-membered nitrogen containing heterocyclic ring which may be substituted by halogen, lower alkyl, trifluoromethyl, nitro or amino. The suitable 5-membered nitrogen containing heterocycles are those containing 1 or 2 hetero atoms wherein the second hetero atom can be nitrogen or oxygen. Suitable 6-membered nitrogen containing heterocycles are those containing 1 or 2 hetero atoms where the second hetero atom may be nitrogen, oxygen or sulfur.

The term "substituted phenyl" denotes phenyl in which one or more of the hydrogens has been replaced by one or more of the functional groups noted below, preferably a substituted phenyl represented by the group

wherein $R_3$ and $R_4$ are each independently hydrogen, halogen, lower alkyl, lower alkoxy, trifluoromethyl, nitro or amino.

Exemplary "aryl" groups within the meaning of the term as used in this specification are phenyl, halophenyl, e.g., p-chlorophenyl, o-chlorophenyl, lower alkylphenyl, e.g., p-methylphenyl, p-trifluoromethylphenyl and aminophenyl.

The term "aralkyl" denotes an alkyl group in which the terminal carbon atom is substituted by "aryl" group as defined above. The "aralkyl" groups of this invention include the phenyl-lower alkyls and substituted phenyl-lower alkyls represented by

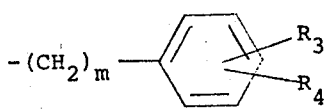

wherein $m$ is an integer from 1–6 and $R_3$ and $R_4$ are each independently hydrogen, halogen, lower alkyl, lower alkoxy, trifluoromethyl, nitro or amino.

Illustrative examples of "aralkyl" groups include the following: o-chlorobenzyl, p-chlorobenzyl, o-fluorobenzyl, p-fluorobenzyl, p-lower alkylbenzyl, p-lower alkoxybenzyl, phenethyl, furfuryl, 2-oxazolylmethyl, 3-isoxazolylmethyl, pyridyl-lower alkyl, e.g., 2-pyridylmethyl, 3-pyridylmethyl and 4-pyridylmethyl, pyrimidyl-lower alkyl, e.g., 2-pyrimidylmethyl and 5-pyrimidylmethyl, pyrazinyl-lower alkyl and the like.

The novel (2-nitro-1-imidazolyl)-carbamates of the invention as well as their acid addition salts with pharmaceutically acceptable acids are useful chemotherapeutic agents. More particularly, the novel compounds of the present invention possess antiprotozoal and antibacterial properties which make them effective against a variety of diseases. They are particularly useful in combatting protozoa such as *Trichomonas vaginalis*, *Trichomonas foetus*, *Endamoeba histolytica*, and the like.

For use in the treatment of infectious protozoal diseases such as trichomoniasis and the like, the compounds of the invention can be administered orally, parenterally or topically. They can be formulated into conventional pharmaceutical dosage forms in admixture with organic or inorganic inert carrier materials which are suitable for enteral or topical administration. Examples of such materials include water, gelatin, lactose, starch, magnesium stearate, talc, gum arabic, polyalkylene glycols, cocoa butter or other excipients commonly recognized in the art of pharmaceutical compounding. Compositions containing the novel compounds of the invention and such pharmaceutically acceptable inert carrier materials may be formulated into tablets, dragees, suppositories, capsules, ointments, creams and the like. Such dosage forms may also contain other additives such as preserving, stabilizing, or wetting agents, salts for varying the osmotic pressure, buffers and the like. Additionally, such dosage forms may also contain other therapeutically useful compounds. Typical oral dosage forms of the novel compounds of the present invention and their pharmaceutically acceptable acid addition salts are administered daily in amounts equivalent to from about 5 mg. to about 50 mg./kg. of body weight of the host, although higher or lower dosages may be given due to variance in species and individual requirements.

The acid addition salts of the novel compounds of the invention are prepared by reacting them in the conventional manner with inorganic acids such as hydrochloric acid, hydrobromic acid, sulfuric acid and the like or with organic acids such as oxalic acid, acetic acid, lactic acid, tartaric acid and the like. Non-pharmaceutically acceptable acid addition salts can be converted into pharmaceutically acceptable acid addition salts by neutralization followed by reaction with a suitable pharmaceutically acceptable acid.

The compound of formula I wherein A is a polymethylene chain of from 2 to 6 carbon atoms and B is an amino radical, a substituted amino or a 5- or 6-membered nitrogen-containing heterocycle represented by $$-N\underset{\phantom{x}}{\overset{\phantom{x}}{\bigcirc}}Z$$

wherein Z is as defined above are prepared by first reacting 2-nitroimidazole with a halogenated alkanol. For example, where A in formula I represents a methylene chain containing two carbon atoms, 2-haloethanol would be utilized. The reaction is conveniently carried out in a conventional inert organic solvent at a temperature of from about 80° to about 140°C. preferably between about 100° and 110°C. The resulting 2-nitro-1-imidazolyl alkanol thus-formed is then reacted with 2,2,2-trichloroethylchlorocarbamate to form the corresponding 2,2,2-trichloroethyl-(2-nitro-1-imidazolyl)alkyl carbonate. The reaction is conveniently carried out at reflux temperature in the presence of a conventional inert organic solvent. The resulting carbonate is then reacted with a suitable amine to form the compound of formula I. The choice of amine will determine the specific configuration of B as defined above. For example, the reaction of 2,2,2-trichloroethyl 2-(2-nitro-1-imidazolyl)ethyl carbonate with furfurylamine yields 2-(2-nitro-1-imidazolyl)ethyl furfurylcarbamate, reaction with m-fluorobenzylamine yields 2-(2-nitro-1-imidazolyl)ethyl m-fluorobenzyl carbamate and so forth. Generally, this reaction is run at ambient temperatures utilizing the basic amine itself as the solvent. Where the amine is not amenable to acting as the solvent, e.g., m-fluorobenzyl amine, a conventional, inert organic solvent is utilized.

The inert organic solvents as utilized herein are those commonly recognized in the art. Among the preferred solvents are N,N-dimethylformamide, N,N-dimethylacetamide, dimethylformamide, N,N-dimethylacetamide, dimethylsulfoxide, methylene chloride, lower alkanols, e.g., methanol, ethanol and the like, hydrocarbon solvents, e.g., benzene, toluene and the like.

The compounds of formula I wherein A is a polymethylene chain and B is phenyl amino or meta-chlorophenyl amino may be prepared directly from the alkanol by reaction with the corresponding isocyanate, i.e., phenylisocyanate and m-chlorophenylisocyanate. The reaction is conveniently carried in a conventional inert organic solvent, i.e., xylene, benzene and the like under reflux conditions.

The compounds of formula I-B above are prepared by initially reacting 2-nitroimidazole with a compound represented by the formula

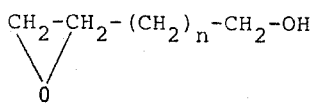

wherein *n* is an integer of 0 to 3. Exemplary of such compounds is 1,2-epoxy-3-hydroxypropane (glycidol). The reaction is preferably carried out under alkaline conditions at a temperature of from about 85° to about 140°C., preferably from about 100° to about 120°C. to yield the corresponding alkanol e.g., the reaction of 2-nitroimidazole and glycidol yields 2-hydroxy-3-(2-nitro-1-imidazolyl)-propanol. The thus-formed alkanol is then reacted with 2,2,2-trichloroethylchlorocarbonate and the appropriate amine as described above.

The compounds of formula I-C are prepared as described above for the compounds of formula I-B by reacting 2-nitroimidazole with a compound represented by the formula

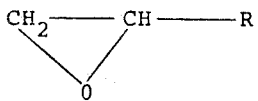

wherein R is as defined in formula I-C to form a compound of the formula

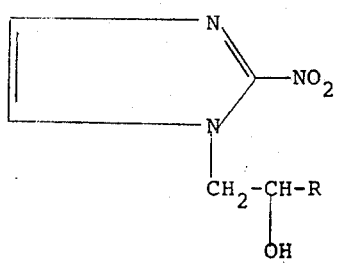

This compound is in turn treated with 2,2,2-trichloroethylchlorocarbonate and the appropriate amine as described above to yield the compounds of formula I-C.

As an alternate to the above procedure, the compounds represented by the formula

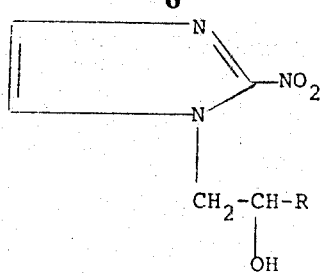

where R is as defined above are treated with 12.5 percent phosgene in benzene in the presence of N,N-dimethyl aniline at a temperature of from about −10° to about 15°C. preferably from about 0° to about 10°C. The reaction mixture is treated with nitrogen gas to drive off the solvent and then treated with appropriate amine to yield the corresponding compound of the formula I-C, i.e.,

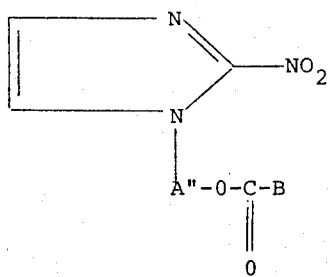

wherein A″ and B are as defined above.

The following examples serve to further illustrate the invention. All temperatures are in degrees Centigrade.

EXAMPLE 1

A total of 100 g. (0.884 moles) of 2-nitroimidazole was dissolved in 215 ml. of methanol containing an equimolar amount of sodium methoxide. One liter of dimethylformamide was added thereto and the mixture was heated in an open flask to 152° to drive off the methanol. The mixture was then cooled to about 100° and 68.4 ml. of 2-bromoethanol was added. The reaction mixture was maintained at a temperature between 100° and 110° for about 1¼ hours and then evaporated to dryness under vacuum. The residue was mixed with 500 ml. of acetone, filtered and the filtrate evaporated to dryness under vacuum. The resulting solids were slurried with 150 ml. of a saturated aqueous sodium carbonate solution followed by filtration to yield a crude product melting point 110°–112°. The aqueous sodium carbonate filtrate was extracted 4 times with 500 ml. portions of ethyl acetate. The combined extracts were then concentrated to 15 ml. to yield an additional amount of crude product, melting point 111°–113°. The crude product yields were combined and recrystallized from 1.1 liter of ethyl acetate to yield 2-(2-nitro-1-imidazolyl)ethanol, melting point 112°–114°.

EXAMPLE 2

A total of 55 grams of the 2-(2-nitro-1-imidazolyl) ethanol formed in Example 1 was dissolved in 2 liters of methylene chloride. To this mixture was added 60 ml. of 2,2,2-trichloroethylchlorocarbonate followed by the addition, over a period of 10 minutes, of 100 ml. of triethylamine. The reaction mixture was heated to reflux temperature over a period of about 30 minutes and was then cooled to 15° and extracted with two 1 liter portions of water. The organic layer which separated was dried over anhydrous magnesium sulfate and concentrated under vacuum to dryness. The resulting residual moist solids were shaken with four 250 ml. portions of hexane. The remaining pink solids were slurried with 250 ml. of ethanol to yield a pale yellow solid having a melting point of 91°–95.5°. This crude product was recrystallized from a mixture of 300 ml. of chloroform and 350 ml. of hexane to yield 2,2,2-trichloroethyl-2'-(2-nitro-1-imidazolyl)ethyl carbonate having a melting point of 94°–96°. Some additional product was isolated from the mother liquor.

EXAMPLE 3

A total of 2.03 grams of 2,2,2-trichloroethyl 2'-(2-nitro-1-imidazolyl)ethyl carbonate formed in Example 2 was dissolved in 20 ml. of furfurylamine. The reaction mixture was allowed to stand at room temperature for 30 minutes and then concentrated under vacuum at 50° to yield a yellow gummy residue. The residue was dissolved in 5 ml. of ethanol and isolated by the addition of 40 ml. of ether to yield 2-(2-nitro-1-imidazolyl) ethyl furfurylcarbamate, melting point 79.9°–80.2°.

EXAMPLE 4

Utilizing the 2,2,2-trichloroethyl 2'-(2-nitro-1-imidazolyl)ethyl carbonate formed in Example 2, the following compounds were prepared in accordance with the method of Example 3 by reaction with the corresponding amines as given: from isopropyl amine there was obtained 2-(2-nitro-1-imidazolyl)ethyl isopropyl carbamate, m.p. 73.5°–75°; from ammonia there was obtained 2-(2-nitro-1-imidazolyl)ethyl carbamate, m.p. 143.5°–145°; from methylamine there was obtained 2-(2-nitro-1-imidazolyl) ethyl methyl carbamate, m.p. 77°–78°; from t-butylamine there was obtained 2-(2-nitro-1-imidazolyl)ethyl tert-butylcarbamate, m.p. 119°–120°; from dimethylamine there was obtained 2-(2-nitro-1-imidazolyl)ethyl dimethylcarbamate, m.p. 51°–52°; from morpholine there was obtained 4-[(2-(2-nitro-1-imidazolyl)ethoxycarbonyl)] morpholine, m.p. 84.5°–85°; from 2-hydroxy-ethylamine there was obtained 2-(2-nitro-1-imidazolyl)ethyl 2'-hydroxyethylcarbamate, m.p. 100.5°–102.5°; from m-fluorobenzylamine there was obtained 2-(2-nitro-1-imidazolyl)ethyl m-fluorobenzylcarbamate, m.p. 74.7°–75.5°; from benzylamine there was obtained 2-(2-nitro-1-imidazolyl)ethyl benzylcarbamate, m.p. 87.7°–88.5°; from ethylamine there was obtained 2-(2-nitro-1-imidazolyl)ethyl ethylcarbamate, m.p. 67.5°–68.7°; from 1-methyl piperazine there was obtained 2-(2-nitro-1-imidazolyl) ethyl 4-methyl-1-piperazinecarboxylate, m.p. 106°–107°; from piperidine there was obtained 2-(2-nitro-1-imidazolyl)ethyl 1-piperidinecarboxylate, m.p. 90°–91.3°; from pyrrolidine there was obtained 2-(2-nitro-1-imidazolyl)ethyl ester of 1-pyrrolidinecarboxylic acid, m.p. 58°–59°; from cyclopropylamine there was obtained 2-(2-nitro-1-imidazolyl)ethyl cyclopropylcarbamate, m.p. 62°–63.5°; from 2-pyridylmethylamine there was obtained 2-nitro-1-imidazolyl)ethyl 2-pyridylmethylcarbamate, m.p. 118°–119°.

In the foregoing reactions the following deviations from the procedure of Example 3 are to be noted: in the preparation of 2-(2-nitro-1-imidazolyl)ethyl tert-butylcarbamate, the reaction was refluxed and not run at room temperature; in the preparation of 2-(2-nitro-1-imidazolyl)-ethyl tert-butylcarbamate and 2-(2-nitro-1-imidazolyl)ethyl m-fluorobenzylcarbamate, acetone was utilized as a solvent medium instead of only the basic amine.

EXAMPLE 5

A total of 12.04 g. of the 2-(2-nitro-1-imidazolyl)ethanol prepared in Example 1 was combined with 15.5 ml. of phenylisocyanate and 31 ml. of xylene and the mixture refluxed for 45 minutes. The mixture was then allowed to cool whereupon an oily layer separated which solidified after several minutes. The mixture was allowed to sit at ambient temperature for about four hours after which it was filtered to collect the solids. The crude product was recrystallized from 375 ml. of chloroform to yield pure 2-(2-nitro-1-imidazolyl)ethyl carbanilate having a m.p. of 133°–134°.

Utilizing the above procedure with m-chlorophenylisocyanate yielded 2-(2-nitro-1-imidazolyl)ethyl m-chlorocarbanilate, m.p. 130.5°–131.5°.

EXAMPLE 6

The procedure of Example 1 was repeated utilizing 3-bromopropanol to yield 3-(2-nitro-1-imidazolyl)propanol. This compound was then reacted in accordance with the procedure in Example 2 to form 2,2,2-trichloroethyl 3'-(2-nitro-1-imidazolyl) propyl carbonate which was in turn reacted in accordance with the procedure of Example 3 with isopropyl amine to yield 3-(2-nitro-1-imidazolyl)propyl isopropylcarbamate, b.p. 220° 0.5 mm.

Utilizing the above procedure the following carbamates were prepared from the given amines: from ammonia there was obtained 3-(2-nitro-1-imidazolyl)propyl carbamate, m.p. 102°–104°; from t-butyl amine there was obtained 3-(2-nitro-1-imidazolyl)propyl tert-butylcarbamate, m.p. 187°–189°; from methyl amine there was obtained 3-(2-nitro-1-imidazolyl)propyl methylcarbamate, m.p. 84.5°–86°; and from dimethylamine there was obtained 3-(2-nitro-1-imidazolyl)propyl dimethylcarbamate, m.p. 48°–50.5°. In the preparation of 3-(2-nitro-1-imidazolyl) propyl tert-butylcarbamate, the reaction was run at reflux temperature.

EXAMPLE 7

The procedure of Example 6 was repeated utilizing 6-bromo-n-hexanol to yield 2,2,2-trichloroethyl 6'-(2-nitro-1-imidazolyl) hexyl carbonate was then treated with ammonia to yield 6-(2-nitro-1-imidazolyl)hexyl carbamate, m.p. 69.5°–71°.

Utilizing the above procedure, the following carbamates were prepared from the given amines: from methyl amine there was obtained 6-(2-nitro-1-imidazolyl)hexyl methylcarbamate, m.p. 61°–63°; from isopropyl amine there was obtained 6-(2-nitro-1-imidazolyl)hexyl isopropylcarbamate, b.p. 217° at 0.1–0.5 mm.; and with dimethyl amine there was obtained 6-(2-nitro-1-imidazolyl)hexyl dimethylcarbamate, b.p. 197°–198° at 0.1–0.5 mm.

EXAMPLE 8

A mixture of 8.23 grams of 2-nitroimidazole, 0.84 grams of anhydrous potassium carbonate and 49 ml. of 1,2-epoxy-3-hydroxy propane (glycidol) was stirred and boiled at a temperature of from 109°–114° for eight minutes and filtered while hot. The filtrate was concentrated under vacuum to dryness. The resulting solids were slurried with 40 ml. of ethanol and filtered to yield crude product. Additional product was recovered from the ethanolic filtrate. The product was recrystallized from 100 ml. of ethanol to yield 2-hydroxy-3-(2-nitro-1-imidazolyl)propanol, m.p. 110°–111°.

The 2-hydroxy-3-(2-nitro-1-imidazolyl)propanol thus-formed was then reacted according to the procedure of Example 2 to form 2,2,2-trichloroethyl 2'-hydroxy-3'-(2-nitro-1-imidazolyl)propyl carbonate.

The 2,2,2-trichloroethyl 2'-hydroxy-3'-(2-nitro-1-imidazolyl)propyl carbonate thus formed was thereafter reacted with dimethyl amine in accordance with the procedure of Example 3 to form 2-hydroxy-3-(2-nitro-1-imidazolyl)-1-propyl dimethylcarbamate, m.p. 96.7°–97.7°.

EXAMPLE 9

In accordance with the procedure set forth in Example 8 the following carbamates were formed utilizing the amines given: from isopropyl amine there was obtained 2-hydroxy-3-(2-nitro-1-imidazolyl)-1-propyl isopropylcarbamate, m.p. 123.2°–124.5°; from ammonia there was obtained 2-hydroxy-3-(2-nitro-1-imidazolyl)-1-propyl carbamate, m.p. 163.5°–164.5°; from benzyl amine there was obtained 2-hydroxy-3-(2-nitro-1-imidazolyl)-1-propyl benzylcarbamate, m.p. 125°–127°; and from morpholine there was obtained 2-hydroxy-3-(2-nitro-1-imidazolyl)-1-propyl 4-morpholinecarboxylate, m.p. 74°–77°.

EXAMPLE 10

In accordance with the procedure of Example 8, 2-nitroimidazole was treated with 1,2-epoxy-3-methoxy propane to yield 1-(2-nitro-1-imidazolyl)-3-methoxy-2-propanol. This compound was in turn treated in accordance with the method of Example 2 to yield 2,2,2-trichloromethyl 1'-(2-nitro-1-imidazolyl)-3'-methoxy-2'-propyl carbonate. The carbonate thus formed was then treated with ammonia in accordance with the procedure of Example 3 to yield 1-(2-nitro-1-imidazolyl)-3-methoxy-2-propyl carbamate, m.p. 116.7°–117.0°.

EXAMPLE 11

In accordance with the procedure set forth in Example 10 the following 2-nitro-1-imidazolyl carbamates were obtained utilizing the following epoxy compounds: from 1,2-epoxypropane there was obtained 1-(2-nitro-1-imidazolyl)-2-propyl carbamate, m.p. 162.5°–164.5°; from 1,2-epoxy-3-fluoropropane there was obtained 1-(2-nitro-1-imidazolyl)-3-fluoro-2-propyl carbamate, m.p. 145°–147°; from 1,2-epoxy-3-chloropropane there was obtained 1-(2-nitro-1-imidazolyl)-3-chloro-2-propyl carbamate, m.p. 125°–126.5°; and from 1,2-epoxy-3-(2-chloroethoxy)propane there was obtained 1-(2-nitro-1-imidazolyl)-3-(2-chloroethoxy)-2-propyl carbamate, m.p. 103°–104.5°.

EXAMPLE 12

As an alternate procedure to the method given in Example 10 the following synthesis of 1-(2-nitro-1-imidazolyl)-2-propyl carbamate was effected. 2-nitroimidazole was treated in accordance with the procedure set forth in Example 8 with 1,2-epoxypropane to yield 1-(2-nitro-1-imidazolyl)-2-propanol.

To a cooled solution of 12.5 percent phosgene-benzene in an ice bath was added 10 grams of 1-(2-nitro-1-imidazolyl)-2-propanol. Over a period of 8 minutes a total of 13 ml. of N,N-dimethyl aniline was added. The mixture was allowed to remain in an ice bath for 1½ hours. The mixture was then removed from the ice bath and treated with nitrogen gas until the solvent had evaporated leaving a brown gum. 100 Ml. of liquid ammonia was added to this residue and the mixture was allowed to evaporate overnight. The resulting solids were slurried first with ethanol and then with water followed by evaporation to yield crude 1-(2-nitro-1-imidazolyl)-2-propyl carbamate, m.p. 157°–162°. The product, along with some additional product recovered from the mother liquor, was recrystallized from methanol to yield pure 1-(2-nitro-1-imidazolyl)-2-propyl carbamate, m.p. 162.5°–164.5°.

EXAMPLE 13

In accordance with the procedure set forth in Example 12 above 1-(2-nitro-1-imidazolyl)-3-(2-chlorophenoxy)-2-propyl carbamate, m.p. 111°–112° was formed utilizing as the epoxy compound 1,2-epoxy-3-(2-chlorophenoxy)propane.

We claim:
1. A (2-nitro-1-imidazolyl) carbamate represented by the formula

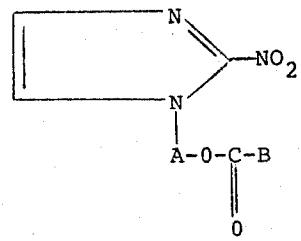

wherein
A represents a member of the group consisting of a polymethylene chain having from 2 to 6 carbon atoms;

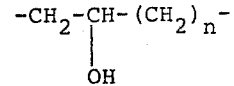

wherein $n$ is an integer of 1 to 4;
and

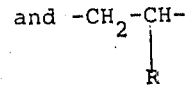

wherein
R is selected from the group consisting of lower alkyl, halo-lower alkyl, halo-lower alkoxy-lower alkyl, lower alkoxy-lower alkyl;
and B represents a member selected from the group consisting of: (1) an amino radical selected from the group consisting of amino, mono-lower alkyl amino, di-lower alkyl amino, hydroxy lower alkyl amino, cycloalkylamino, aralkylamino, arylamino; and (2) a 5- or 6- membered nitrogen containing heterocycle represented by

wherein
Z represents lower alkylene, azalower alkylene, N-lower alkyl-aza-lower alkylene or oza-lower alkylene;
and pharmaceutically acceptable acid addition salts thereof.

2. A compound in accordance with claim 1 wherein A is a polymethylene chain of 2 to 6 carbon atoms and B is an amino radical selected from the group consisting of amino, mono-lower alkyl amino, di-lower alkyl amino, hydroxy lower alkyl amino, cycloalkylamino, araikylamino and arylamino.

3. A compound in accordance with claim 2 wherein said compound is 4-(2-(2-nitro-1-imidazolyl)ethoxycarbonyl) morpholine.

4. A compound in accordance with claim 2 wherein said compound is 2-(2-nitro-1-imidazolyl)ethyl isopropylcarbamate.

5. A compound in accordance with claim 2 wherein said compound is 2-(2-nitroimidazolyl)ethyl carbamate.

6. A compound in accordance with claim 2 wherein said compound is 2-(2-nitro-1-imidazolyl)ethyl methylcarbamate.

7. A compound in accordance with claim 2 wherein said compound is 2-(2-nitro-1-imidazolyl)ethyl tert-butylcarbamate.

8. A compound in accordance with claim 2 wherein said compound is 2-(2-nitro-1-imidazolyl)ethyl dimethylcarbamate.

9. A compound in accordance with claim 2 wherein said compound is 2-(2-nitro-1-imidazolyl)ethyl 2'-hydroxyethylcarbamate.

10. A compound in accordance with claim 2 wherein said compound is 2-(2-nitro-1-imidazolyl)ethyl m-fluorobenzylcarbamate.

11. A compound in accordance with claim 2 wherein said compound is 2-(2-nitro-1-imidazolyl)ethyl benzylcarbamate.

12. A compound in accordance with claim 2 wherein said compound is 2-(2-nitro-1-imidazolyl)ethyl ethylcarbamate.

13. A compound in accordance with claim 2 wherein said compound is 2-(2-nitro-1-imidazolyl)ethyl ester of 1-pyrrolidinecarboxylic acid.

14. A compound in accordance with claim 2 wherein said compound is 2-(2-nitro-1-imidazolyl)ethyl cyclopropylcarbamate.

15. A cmpound in accordance with claim 2 wherein said compound is 2-(2-nitro-1-imidazolyl)ethyl 2-pyridylmethylcarbamate.

16. A compound in accordance with claim 2 wherein said compound is 2-(2-nitro-1-imidazolyl)ethyl carbanilate.

17. A compound in accordance with claim 2 wherein said compound is 2-(2-nitro-1-imidazolyl)ethyl m-chlorocarbanilate.

18. A compound in accordance with claim 2 wherein said compound is 3-(2-nitro-1-imidazolyl)propyl isopropylcarbamate.

19. A compound in accordance with claim 2 wherein said compound is 3-(2-nitro-1-imidazolyl)propyl carbamate.

20. A compound in accordance with claim 2 wherein said compound is 3-(2-nitro-1-imidazolyl)propyl tert-butylcarbamate.

21. A compound in accordance with claim 2 wherein said compound is 3-(2-nitro-1-imidazolyl)propyl methylcarbamate.

22. A compound in accordance with claim 2 wherein said compound is 3-(2-nitro-1-imidazolyl)propyl dimethylcarbamate.

23. A compound in accordance with claim 2 wherein said compound is 6-(2-nitro-1-imidazolyl)hexyl carbamate.

24. A compound in accordance with claim 2 wherein said compound is 6-(2-nitro-1-imidazolyl)hexyl methylcarbamate.

25. A compound in accordance with claim 2 wherein said compound is 6-(2-nitro-1-imidazolyl)hexyl isopropylcarbamate.

26. A compound in accordance with claim 2 wherein said compound is 6-(2-nitro-1-imidazolyl)hexyl dimethylcarbamate.

27. A compound in accordance with claim 1 wherein A is a polymethylene chain of 2 to 6 carbon atoms and B is a 5- or 6- membered heterocycle represented by

wherein
Z represents lower alkylene, aza-lower alkylene, N-lower alkyl-aza-lower alkylene or oza-lower alkylene.

28. A compound in accordance with claim 27 wherein said compound is 2-(2-nitro-1-imidazolyl)ethyl furfurylcarbamate.

29. A compound in accordance with claim 27 wherein said compound is 4-(2-(2-nitro-1-imidazolyl)ethoxycarbonyl)morpholine.

30. A compound in accordance with claim 27 wherein said compound is 2-(2-nitro-1-imidazolyl)ethyl 4-methyl-1-piperazinecarboxylate.

31. A compound in accordance with claim 27 wherein said compound is 2-(2-nitro-1-imidazolyl)ethyl 1-piperidinecarboxylate.

32. A compound in accordance with claim 1 wherein A is represented by the formula

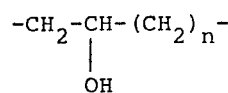

wherein
$n$ is an integer of 1 to 4.

33. A compound in accordance with claim 32 wherein said compound is 2-hydroxy-3-(2-nitro-1-imidazolyl)-1-propyl dimethylcarbamate.

34. A compound in accordance with claim 32 wherein said compound is 2-hydroxy-3-(2-nitro-1-imidazolyl)-1-propyl isopropylcarbamate.

35. A compound in accordance with claim 32 wherein said compound is 2-hydroxy-3-(2-nitro-1-imidazolyl)-1-propyl carbamate.

36. A compound in accordance with claim 32 wherein said compound is 2-hydroxy-3-(2-nitro-1-imidazolyl)propyl benzylcarbamate.

37. A compound in accordance with claim 32 wherein said compound is 2-hydroxy-3-(2-nitro-1-imidazolyl)propyl 4-morpholinecarboxylate.

38. A compound in accordance with claim 1 wherein A is represented by the formula

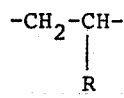

wherein
R is selected from the group consisting of lower alkyl, halo lower alkyl, halo-lower alkoxy-lower alkyl, lower alkoxy-lower alkyl.

39. A compound in accordance with claim 38 wherein said compound is 1-(2-nitro-1-imidazolyl)-2-propyl carbamate.

40. A compound in accordance with claim 38 wherein said compound is 1-(2-nitro-1-imidazolyl)-3-fluoro-2-propyl carbamate.

41. A compound in accordance with claim 38 wherein said compound is 1-(2-nitro-1-imidazolyl)-3-chloro-2-propyl carbamate.

42. A compound in accordance with claim 38 wherein said compound is 1-(2-nitro-1-imidazolyl)-3-(2-chloroethoxy)-2-propyl carbamate.

43. A compound in accordance with claim 38 wherein said compound is 1-(2-nitro-1-imidazolyl)-3-methoxy-2-propyl carbamate.

44. A compound in accordance with claim 38 wherein said compound is 1-(2-nitro-1-imidazolyl)-3-methoxy-2-propyl isopropylcarbamate.

45. A compound in accordance with claim 38 wherein said compound is 1-(2-nitro-1-imidazolyl)-3-methoxy-2-propyl dimethylcarbamate.

46. A compound in accordance with claim 38 wherein said compound is 1-(2-nitro-1-imidazolyl)-3-methoxy-2-propyl methyl carbamate.

47. A compound in accordance with claim 38 wherein said compound is 2-[3-methoxy-1-(2-nitro-1-imidazolyl]propyl 4-morpholinecarboxylate.

* * * * *